United States Patent
Han et al.

(10) Patent No.: US 7,295,539 B2
(45) Date of Patent: Nov. 13, 2007

(54) APPARATUS AND METHOD FOR GENERATING TRANSMISSION/RECEPTION REFERENCE TIMING IN A MOBILE TERMINAL

(75) Inventors: Sung-Chul Han, Songnam-shi (KR); Joo-Kwang Kim, Yongin-shi (KR); Chae-Man Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 993 days.

(21) Appl. No.: 10/426,016

(22) Filed: Apr. 30, 2003

(65) Prior Publication Data

US 2004/0047333 A1 Mar. 11, 2004

(30) Foreign Application Priority Data

May 3, 2002 (KR) ...................... 10-2002-0024546

(51) Int. Cl.
*H04B 7/216* (2006.01)
(52) U.S. Cl. ................... 370/335; 370/342; 370/350
(58) Field of Classification Search ............... 370/335, 370/342, 320, 304, 324, 326, 350, 345, 441, 370/503

See application file for complete search history.

(56) References Cited

U.S. PATENT DOCUMENTS 6,775,242 B2 * 8/2004 Grilli et al. ................. 370/252
6,847,630 B2 * 1/2005 Blanz et al. ................ 370/350

* cited by examiner

*Primary Examiner*—Chau Nguyen
*Assistant Examiner*—Hicham B Foud
(74) *Attorney, Agent, or Firm*—Roylance, Abrams, Berdo & Goodman, L.L.P.

(57) ABSTRACT

An apparatus and method for generating reference timings. Each of at least two Node Bs transmits a first channel signal for providing a reference timing and a second channel signal different from the first channel signal and a UE has a plurality of fingers for demodulating the first channel signals. A first timing generator receives an SFN of a reference Node B having a communication link established with the UE, selects a first channel FB timing from a reference finger, and generates an SFN reference timing based on the SFN and the selected first channel FB timing. A second timing generator generates a second channel FB timing to demodulate the second channel signal of the reference Node B from the selected first channel FB timing through offset control. A third timing generator generates an uplink channel FB timing having a predetermined offset from the second channel FB timing.

28 Claims, 8 Drawing Sheets

APPARATUS AND METHOD FOR GENERATING TRANSMISSION/RECEPTION REFERENCE TIMING IN A MOBILE TERMINAL

PRIORITY

This application claims priority under 35 U.S.C. § 119 to an application entitled "Apparatus and Method for Generating Transmission/Reception Reference Timing in a Mobile Terminal" filed in the Korean Industrial Property Office on May 3, 2002 and assigned Serial No. 2002-24546, the contents of which are incorporated herein by reference.

BACKGROUND OF THE INVENTION

1. Field of the Invention

The present invention relates generally to a mobile terminal, and in particular, to an apparatus and method for generating a transmission/reception timing in a mobile terminal adopting asynchronous code division multiple access (CDMA).

2. Description of the Related Art

Along with the rapid development of mobile communication technology, user demands for various services have increased with a drastic increase in the amount of data traffic for the services. To transmit larger amounts of data at high rate, $3^{rd}$ generation (3G) mobile communication systems have been designed. There are two categories of 3G systems: an asynchronous system, (wide-band CDMA (W-CDMA)) and a synchronous system (CDMA-2000). W-CDMA was adopted as the standard for Europe, while CDMA-2000 as the standard for the U.S. In CDMA-2000, each base station (BS) receives reference timing information from global positioning system (GPS) satellites and acquires the whole system synchronization based on the reference timing information. In W-CDMA systems, Node Bs are not synchronized to each other in reference to time. There is no need to synchronize the Node Bs to the GPS timing. Hence, timing control in W-CDMA systems is more difficult, relative to timing control in CDMA-2000.

Figure 1:
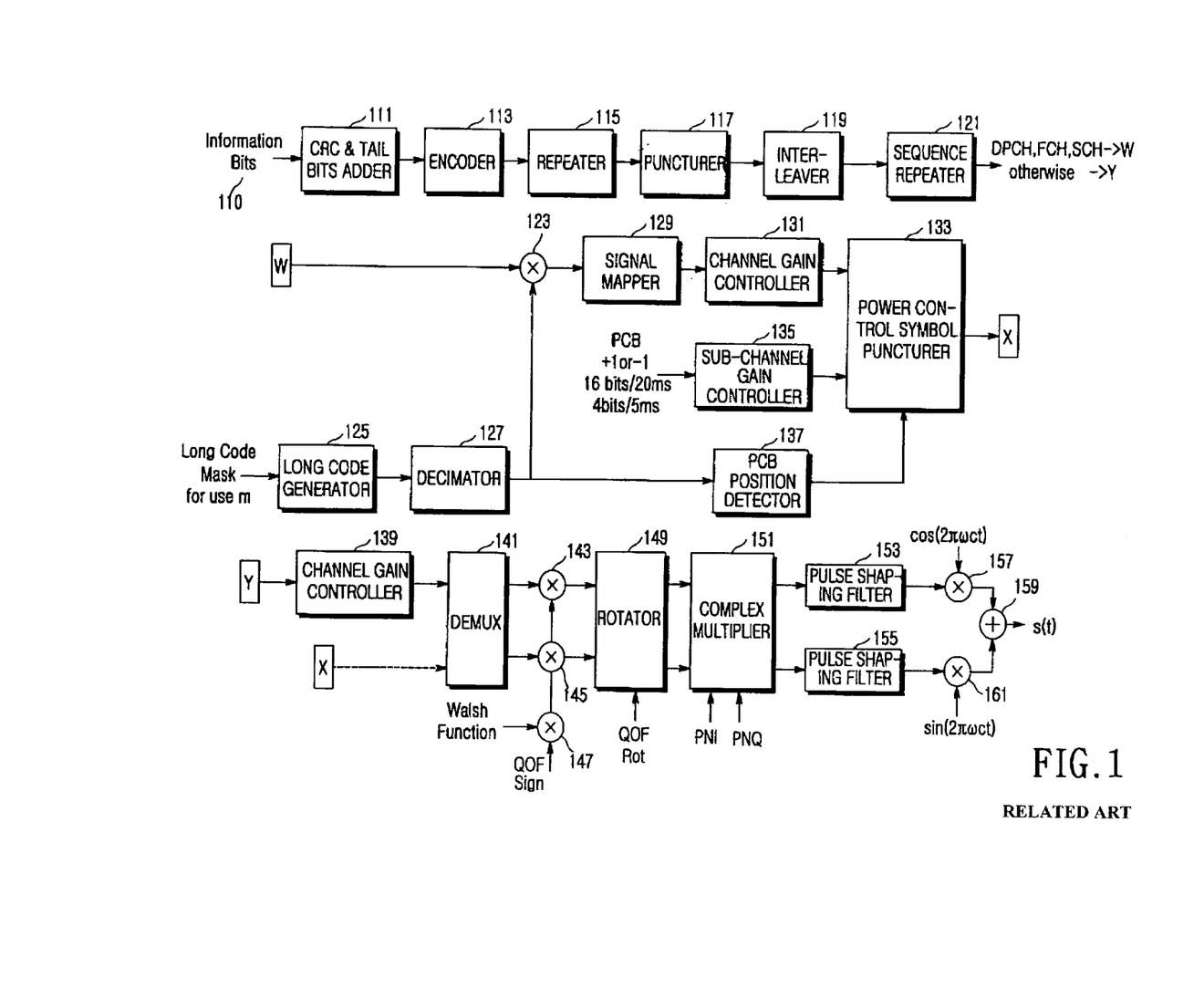
FIG. 1 is a block diagram of a channel transmitting apparatus for a BS in a typical synchronous CDMA system.

With reference to FIG. 1, channel signal transmissions from a BS in a CDMA-2000 system will be described below. FIG. 1 is a block diagram of a channel transmitting apparatus for a BS in a typical CDMA-2000 system.

Referring to FIG. 1, upon generation of information bits 110 targeted at mobile station (MS) "m," a CRC & tail bits adder 111 adds a CRC (cyclic redundancy code) and tail; bits to the information bits 110. An encoder 113 encodes the CRC & tail bits-added bits at a predetermined coding rate, for example, at ⅓ in a predetermined coding method such as convolutional coding or turbo coding.

A repeater 115 repeats code symbols received from the encoder 113 according to the number of bits transmittable on a physical channel such as a dedicated physical channel (DPCH), a fundamental channel (FCH), or a sync channel (SCH). A puncturer 119 punctures some of the repeated symbols according to the number of bits suitable for the physical channel. An interleaver 119 block-interleaves the punctured symbols to prevent burst errors. A sequence repeater 121 repeats the interleaved symbols on a sequence basis and transmits the repeated sequences on the physical channel. Hereinafter, a signal delivered on a physical channel such as DPCH, FCH, or SCH is referred to as "W" and a signal delivered on any other physical channel is referred to as "Y".

The signal W is applied to the input of a multiplier 123 and a long code mask for MS m (i.e., user m), is fed to a long code generator 125. The long code generator 125 generates a long code for MS m in correspondence with the long code mask, and a decimator 127 decimates the long code. A power control bit (PCB) position detector 137 detects timing for transmitting PCBs, that is, the positions of the PCBs using the decimated signal.

The multiplier 123; multiplies the signal W by the decimated signal. A signal mapper 129 maps 0s and 1s of the multiplied signal to +1s and −1s, respectively when it uses binary phase shift keying (BPSK). A channel gain controller 131 multiplies the output of the signal mapper 129 by a predetermined channel gain, for power amplification. A predetermined number of PCBs, for example, 16 PCBS for a 20-ms frame or 4 PCBS for a 5-ms frame, are fed to a forward power control sub-channel gain controller 135. The forward power control sub-channel gain controller 135 multiplies the received PCBs by a forward power control sub-channel gain. A power control symbol puncturer 133 inserts a transmission power control (TPC) symbol received from the forward power control sub-channel gain controller 135 at the positions detected by the PCB position detector 137 in the output of the channel gain controller 131. The resulting physical channel signal containing power control symbols is referred to as X.

Meanwhile, the signal Y (signals delivered on any other physical channel other than DPCH, FCH, or SCH), is fed to a channel gain controller 139. The channel gain controller 139 multiplies the signal Y by a predetermined channel gain. A demultiplexer (DEMUX) 141 demultiplexes the output of the channel gain controller 139 in time and outputs the demultiplexed symbols to multipliers 143 and 145. If the output of the channel gain controller 139 is successive symbols S1 and S2, the DEMUX 141 feeds the symbol S1 to the multiplier 143 and the symbol S2 to the multiplier 145. A multiplier 147 multiplies a quasi-orthogonal function (QOF) signal by a Walsh function signal. The Walsh function is, for example, a Walsh code. The multipliers 143 and 145 multiply the outputs of the DEMUX 141 by a signal received from the multiplier 147, respectively. A rotator 149 rotates the outputs of the multipliers 143 and 145 by 90 degrees when the QOF signal is enabled under a predetermined control. A complex multiplier 151 multiplies the outputs of the rotator 149 by an in-phase (I) channel pseudorandom noise (PN) code PNI and a quadrature-phase (Q) channel PN code PNQ, respectively. Pulse shaping filters 153 and 155 filter the complex signals received from the complex multiplier 151. A multiplier 157 multiplies the output of the pulse shaping filter 153 by a first carrier $\cos(2\pi wct)$, and a multiplier 161 multiplies the output of the pulse shaping filter 155 by second carrier $\sin(2\pi wct)$. An adder 159 sums the outputs of the multipliers 157 and 161 and outputs the resulting channel signal s(t). The signal X input to the DEMUX 141 as indicated by a dotted line is also processed in the same manner and a corresponding channel signal is generated.

As described above, the channel transmitting apparatus multiplies a channel signal by a Walsh code and a PN code and then converts the channel signal to a pulse signal. The pulse signal is modulated to an RF signal using a carrier. Therefore, the MS must generate the Walsh code and the PN code using the same reference timing as that of the BS, and receive the channel signal using identical Walsh and the PN codes for accurate demodulation. Hence, the BS transmits only the PN code free of the Walsh code on a pilot channel (PICH) to allow the MS to detect the accurate code timings of the Walsh code and the PN code.

Figure 2:
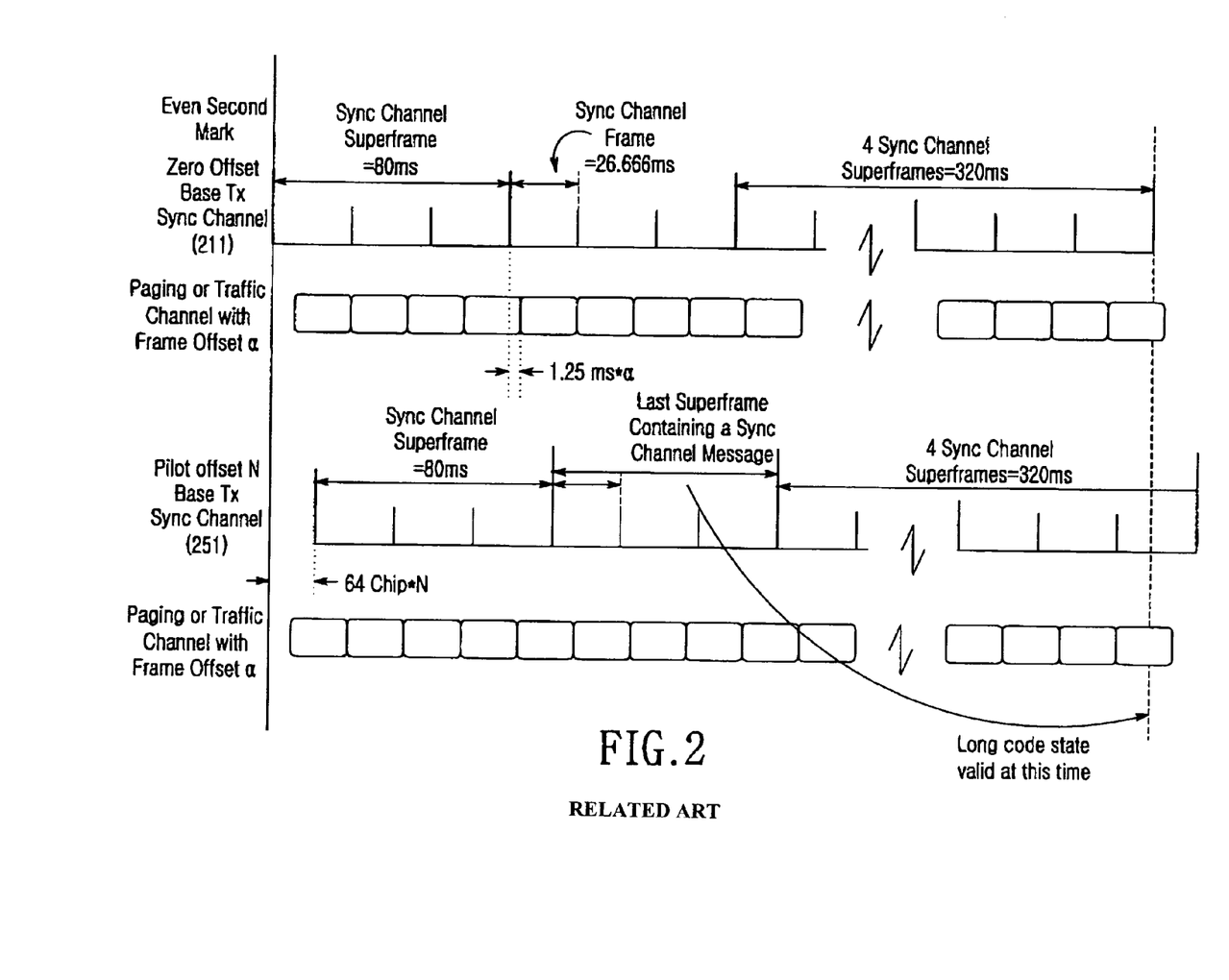
FIG. 2 schematically illustrates the timing relation between BSs in the typical synchronous CDMA system.

With reference to FIG. 2, the timing relation between BSs in the CDMA-2000 system will be described below. FIG. 2 schematically illustrates the timing relation between the BSs in the CDMA-2000 system.

Referring to FIG. 2, an SCH 211 of a first BS has a zero pilot offset and an SCH 251 of a second BS has a pilot offset that is a multiple of 64 chips (64 chips×N). Since each BS uses a PN code having a fixed time offset, for example, a 64 chips×N time offset in the CDMA-2000 system, a MS can acquire the PN code timings of its neighbor BSs only if the MS acquires the PN code timing of one BS. The PN code has a predetermined period, for example, 32,768 chips (=26.6 ms). If the MS acquires the PN code timing of the first BS, it also acquires the PN code timing of the second BS, which is 64 chips×N apart from the PN code timing of the first BS.

However, if the MS is in a power-on condition, the operation timing of the PN code generator in its searcher differs from the reference timing that is the PN code timing of a serving BS. For accurate channel demodulation, the MS synchronizes its PN code timing to that of the BS. This process is called "EPOCH". During the EPOCH, the MS receives a PICH signal from the BS, varying the PN code timing of the PN code generator. If the received PICH signal has a correlation equal to or greater than a preset threshold at a certain timing, the timing is determined as the PN code timing of the BS.

When a traffic channel is assigned between the MS and the BS, a frame offset α exists between the frame boundaries (FBs) of the PICH and the traffic channel. The frame offset is random and maintained until the traffic channel is released. If the MS moves to another cell, a soft handover occurs. The target BS added to an active set receives information about the frame offset α from the old BS. Although a BS can manage a plurality of cells, it is assumed here that the BS manages only one cell. After the soft handover is completed, the target BS assigns a traffic channel with the frame offset α to the MS. Accordingly, if the MS receives signals from the two BSs, they arrive at the same timing despite different pilot offsets.

Meanwhile, since a signal is transmitted in multiple paths in the real radio channel environment, the MS receives a channel signal from the BS in at least one path. Multi-path signals reach the MS at different arrival time according to the lengths of the paths. Thus, correlations equal to or greater than the threshold are obtained at different timings. To receive the multi-path signals, the MS uses a rake receiver. The rake receiver includes a plurality of fingers for demodulating each multi-path signal. Each finger demodulates a signal from a corresponding path and a combiner combines the demodulated signals, thereby effecting diversity. In other words, even if some of the multi-path channel signals are bad, channel signal reception performance is improved by combining the bad channel signals with the other normal channel signals.

Figure 3A:
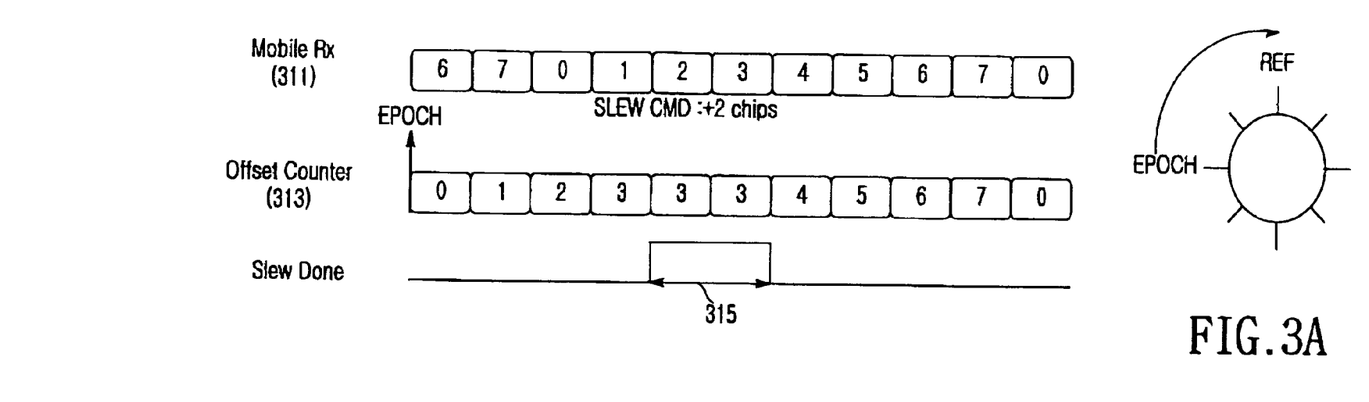
FIGS. 3A and 3B schematically illustrate positive slew and negative slew in an EPOCH in the MS in the typical synchronous CDMA system.

The above-described "EPOCH" will be described with reference to FIGS. 3A and 3B. FIG. 3A schematically illustrates a positive slew in an EPOCH in an MS in the typical CDMA-2000 system. The following description of FIG. 3A is conducted on the assumption that a PN code period is 8 chips (0 to 7).

In FIG. 3A, the difference between the PN code timing of the PN code generator in one of fingers in the MS searcher and that of a BS (i.e. reference timing) is illustrated. A signal Mobile Rx 311 is the BS PN code timing received at the finger. Since the PN code period is 8 chips, the PN code timing starts from 0, proceeds to 7, and then resumes from 0. A signal Offset Counter 313 is the PN code timing of the PN code generator. As illustrated in FIG. 3A, the reference timing is 2 chips earlier than a zero EPOCH point of the PN code timing in the PN code generator. In other words, the PN code timing of the PN code generator is 2 chips earlier than the reference timing. Hence, the PN code generator must generate a PN code with a time delay of 2 chips in order to synchronize the PN code timing to the reference timing. Thus, the PN code generator slews 2 chips positively, as indicated by reference numeral 315. The positive slew changes the PN code timing by 2 chips clockwise with respect to the reference timing "REF".

Figure 3B:
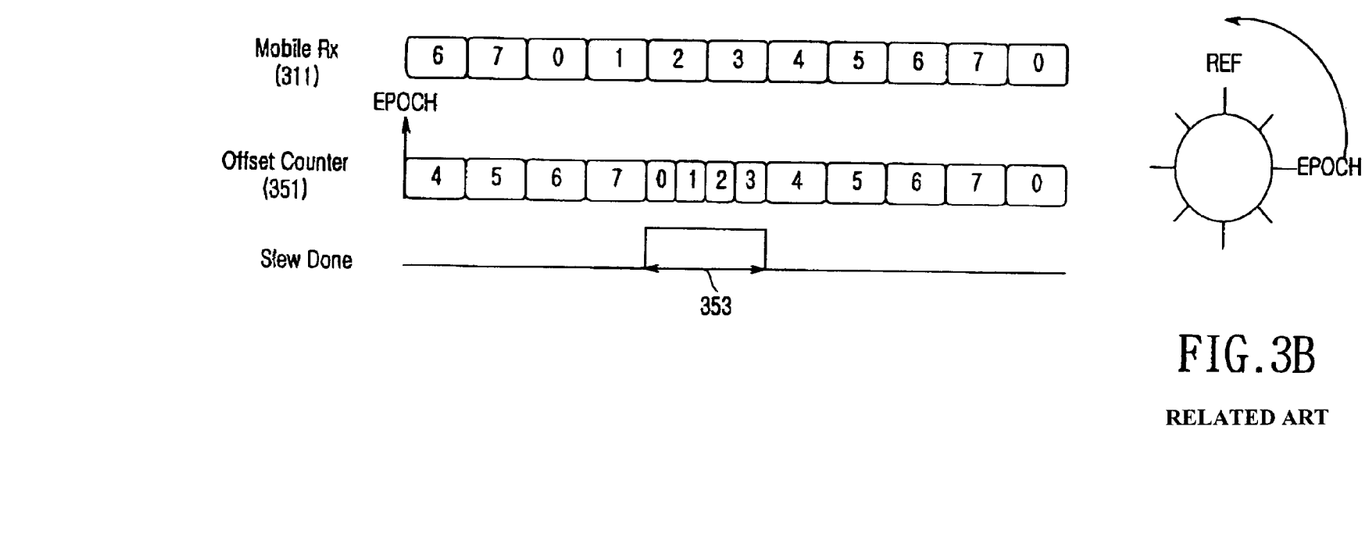

FIG. 3B schematically illustrates negative slew in an EPOCH in the MS in the typical CDMA-2000 system. The following description of FIG. 3B is also conducted on the assumption that a PN code period is 8 chips (0 to 7).

In FIG. 3B, the difference between the PN code timing of the PN code generator and that of the BS is illustrated. The signal Mobile Rx 311 is the BS PN code timing received at the finger. Since the PN code period is 8 chips, the PN code timing starts from 0, proceeds to 7, and then resumes from 0. A signal Offset Counter 351 is the PN code timing of the PN code generator. The reference timing is 2 chips later than the zero EPOCH point. Hence the PN code generator operates twice faster than in a normal operation to synchronize the PN code timing to the reference timing. That is, the PN code generator slews 2 chips negatively, as indicated by reference numeral 353. The negative slew changes the PN code timing by 2 chips counterclockwise with respect to the reference timing "REF".

As described above, upon power-on, the MS receives PICH signals from neighbor BSs, calculates their correlations (i.e. energies), and assigns multi-path signals acquired by the energies to fingers. Each finger slews positively or negatively to thereby synchronize the PN code timing of a PN code generator to a BS PN code timing. This is called "microprocessor-directed slew". Each finger can correct the PN code timing with an accuracy of up to a ⅛-chip resolution. A slew requiring fine correction for the ⅛-chip resolution is termed "a slew by time tracking".

Although the fingers generate different PN code timings, demodulated signals from the fingers must be combined at a certain time point. Since the PN code timings may be changed by slews, combining timing independent of the PN code timings is needed. A reception (Rx) reference timing generator (RTG) is responsible for generating the combining timing. It is possible to generate an Rx reference timing only if the Rx RTG is independent of the PN code timing of each finger, but related to the PN code timing of one arbitrary finger. The finger associated with generation of the Rx reference timing is called "a reference finger".

Figure 4:
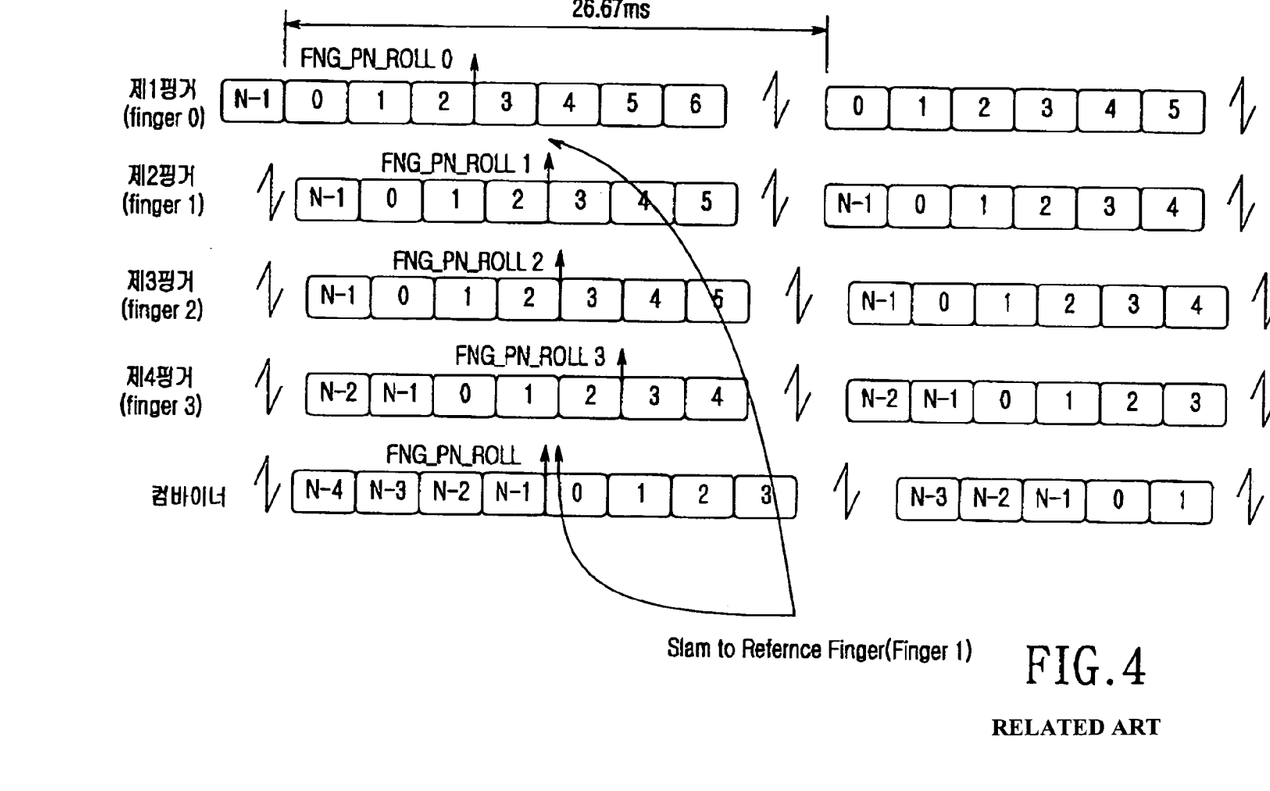
FIG. 4 schematically illustrates the PN code timing relation between fingers and a combiner in an MS searcher in the typical synchronous CDMA system.

The relation between the PN code timings of the fingers and the combining timing will be described with reference to FIG. 4. FIG. 4 illustrates the relation between the PN code timings of the fingers and a combiner in the MS searcher in the typical CDMA-2000 system.

Referring to FIG. 4, it is assumed that the MS searcher has four fingers, finger 0 to finger 3, finger 1 is a reference finger, and a PN code has a period of 26.67 ms. In view of the 26.67-ms period, one pilot symbol contains 128 chips. The four fingers receive PICH signals through an antenna. A predetermined time later, for example, three symbols later, they receive signals "FNG_PN_ROLL n". A signal FNG_PN_ROLL n is generated the predetermined time after an nth finger starts to receive a PICH signal. Because each finger has a different PN code timing, buffered demodulation symbols must be read at the same combining timing using the signal FNG_PN_ROLL n. As illustrated in FIG. 4, if finger 1 is a reference finger, the combiner combines in synchronization to the signal FNG_PN_ROLL 1 generated at finger 1. The Rx reference timing generated in the Rx RTG provides a symbol combining timing for the combiner and a reference timing for later demodulation such as deinterleaving and channel decoding. Thus, the Rx reference timing serves as a base for the overall timings of the channel signal demodulation.

In the CDMA-2000 system, when the MS moves to another BS (i.e. soft handover), the Rx reference timing is maintained since the PN code timings between the BSs are synchronized to the GPS timing. Also, the transmission (Tx) reference timing of the MS is identical to the Rx reference timing. Therefore, there is no need for controlling the Tx reference timing separately. Now, the structure of the RTG for generating the Tx and Rx reference timings will be described below with reference to FIG. 5.

Figure 5:
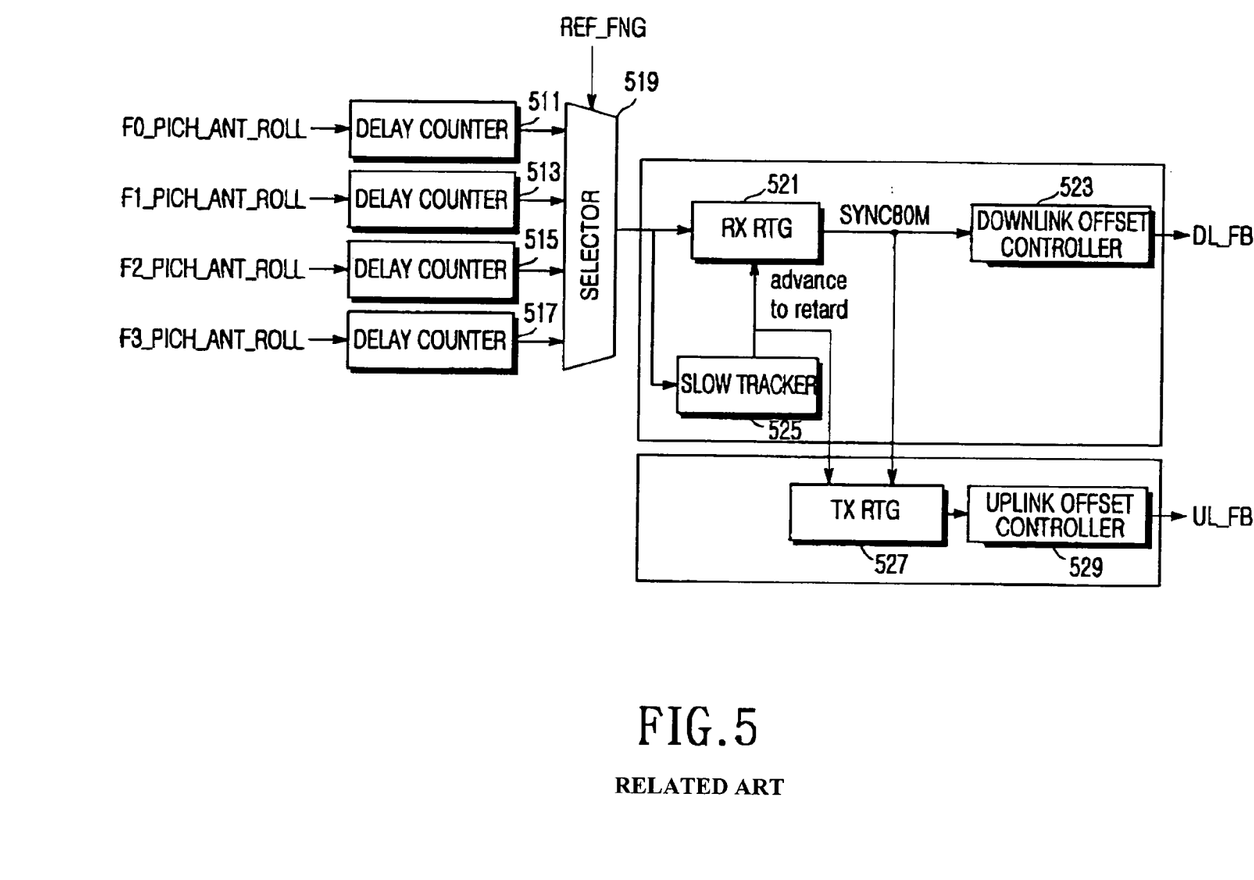
FIG. 5 is a block diagram of an RTG for the MS in the typical synchronous CDMA system.

FIG. 5 is a block diagram of the RTG in the MS in the typical CDMA-2000 system. Referring to FIG. 5, a signal F0_PICH_ANT_ROLL is generated at the time when finger 0 starts to receive a PICH signal, a signal F1_PICH_ANT_ROLL is generated at the time when finger 1 starts to receive a PICH signal, a signal F2_PICH_ANT_ROLL is generated at the time when finger 2 starts to receive a PICH signal, and a signal F3_PICH_ANT_ROLL is generated at the time when finger 3 starts to receive a PICH signal. That is, a signal n_PICH_ANT_ROLL is generated when finger n starts to receive a PICH signal through an antenna. This is different from the signal FNG_PN_ROLL n depicted in FIG. 4. The signal FNG_PN_ROLL n is generated a predetermined time (e.g. 3 symbols) after finger n receives a PICH signal, whereas the signal PICH_ANT_ROLL n is generated when finger n receives the PICH signal.

The signals F0_PICH_ANT_ROLL, F1_PICH_ANT_ROLL, F2_PICH_ANT_ROLL, and F3_PICH_ANT_ROLL are fed to corresponding fixed delay counters 511, 513, 515 and 517. The fixed delay counters 511 to 517 delay the received signals by a predetermined time (e.g. 3 symbols) and output the delayed signals PICH_ANT_ROLL 0, PICH_ANT_ROLL 1, PICH_ANT_ROLL 2, and PICH_ANT_ROLL 3. A selector 519 selects one of the signals PICH_ANT_ROLL 0, PICH_ANT_ROLL 1, PICH_ANT_ROLL 2, and PICH_ANT_ROLL 3 according to a reference finger select signal REF_FNG received from a controller (not shown). The reference finger select signal REF_FNG selects the reference finger. In general, the finger that receives the PICH signal earliest, is selected as the reference finger. However, alternate methods for selecting the reference finger exist. In this example, finger 1 is the reference finger. Thus, selector 519 selects the signal FNG_PN_ROLL 1 and feeds it to the Rx RTG 521.

Rx RTG 521 slams (resets) itself to the input signal, and counts an Rx reference timing period. For example, since the Rx reference timing has a period of 20 ms in CDMA-2000, Rx RTG 519 generates the Rx reference timing of 20 ms after slamming. If the reference finger is changed, the controller picks a new reference finger using the signal REF_FNG, and the selector 519 outputs a different signal correspondingly. A slow tracker 525 slow tracks the Rx reference timing to the changed timing received from the selector 519. The reason for slow tracking the change of the Rx reference timing is to prevent combining errors in received signals.

The Rx reference timing is fed to both a downlink offset controller 523 and a Tx RTG 527. The downlink offset controller 523 acquires a forward FB (DL_FB) by adjusting a forward FB offset based on the Rx reference timing. The Tx RTG 527 generates a Tx reference timing based on the Rx reference timing. The uplink offset controller 529 acquires a reverse FB (UL_FB) by adjusting a reverse FB offset based on the Tx reference timing.

In CDMA-2000, when an MS receives channel signals from a plurality of BSs at a soft handover, the MS can receive the channel signals from the other BSs without separate reference timing controls only if it acquires the PN code timing of one arbitrary BS, because BSs are synchronized to each other based on GPS timing. In W-CDMA, on the other hand, there is no synchronization established between Node Bs and thus each Node B controls reference timing independently. Therefore, when a user equipment (UE) receives channel signals from a plurality of Node Bs, it must control a reference timing for each Node B. As a result, it is impossible to generate Tx and Rx reference timings using a single RTG. Hence, there is a need for a searcher implemented in a minimum amount of hardware to generate the Tx and Rx reference timings in a single RTG.

SUMMARY OF THE INVENTION

It is, therefore, an object of the present invention to provide an apparatus and method for generating Tx/Rx reference timing in a UE in an asynchronous CDMA system.

The above object is achieved by an apparatus and method for generating reference timings. Each of at least two Node Bs transmits a first channel signal for providing a reference timing and a second channel signal different from the first channel signal and a UE has a plurality of fingers for demodulating the first channel signals. In the reference timing generating apparatus, a first timing generator receives a system frame number (SFN) of a reference Node B having a communication link established with the UE, selects a first channel FB timing from a reference finger, and generates an SFN reference timing based on the SFN and the selected first channel FB timing. A second timing generator generates a second channel FB timing to demodulate the second channel signal of the reference Node B from the selected first channel FB timing through offset control. A third timing generator generates an uplink channel FB timing having a predetermined offset from the second channel FB timing.

In the reference timing generating method, an SFN of a reference Node B having a communication link established with the UE is received, a first channel FB from a reference finger that earliest demodulates the first channel signal from the reference Node B is selected among the FB timings of the first channel signals from the reference Node B demodulated in the fingers, an SFN reference timing is generated based on the SFN of the reference Node B and the first channel FB timing of the reference finger, a second channel FB timing is generated by giving a predetermined timing offset to the first channel FB timing of the reference finger to demodulate the second channel signal from the reference Node B, and an uplink channel FB timing is generated to have a predetermined offset from the second channel FB timing.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Various embodiments of the present invention will be described herein below with reference to the accompanying drawings. In the following description, well-known functions or constructions are not described in detail since they would obscure the invention in unnecessary detail.

Figure 6:
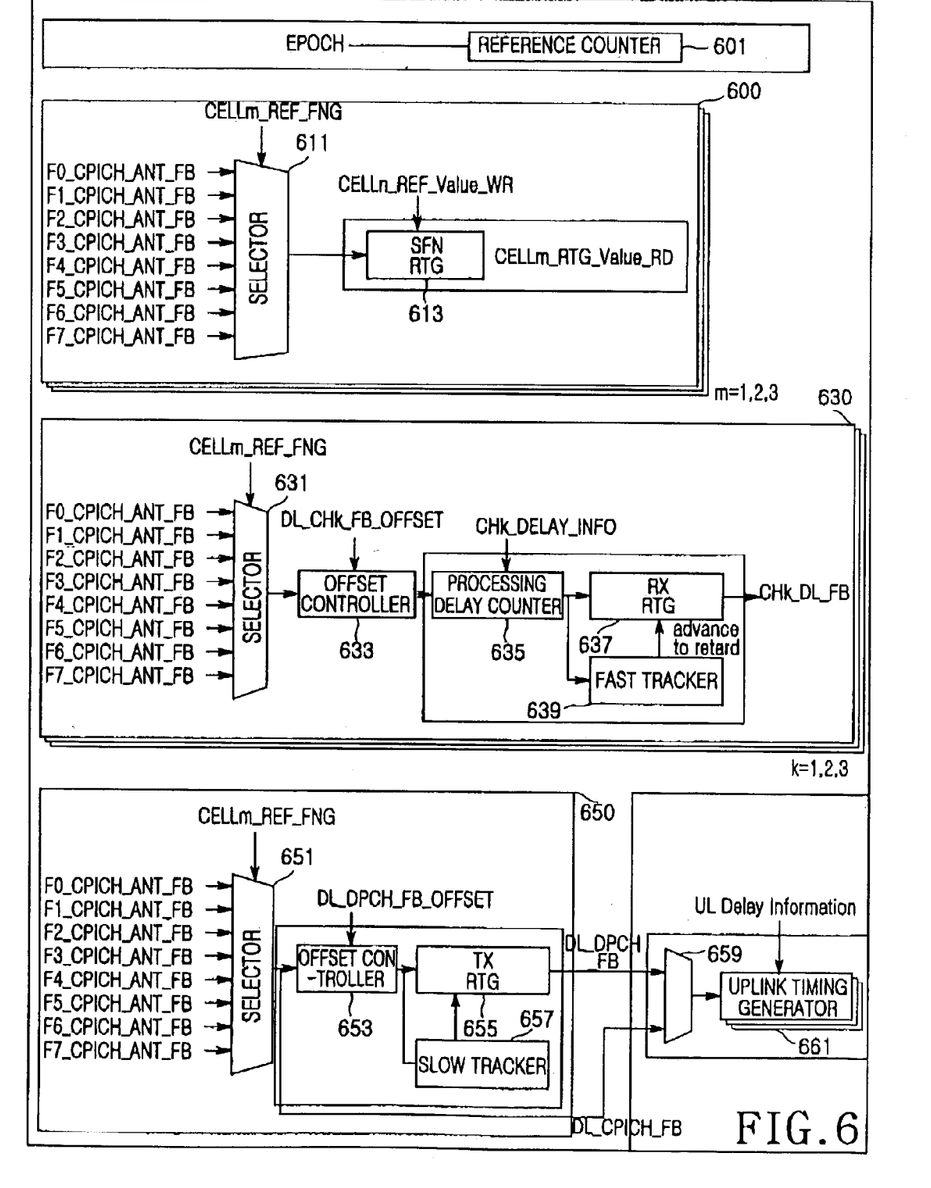
FIG. 6 is a block diagram of an RTG for a UE in an asynchronous CDMA system according to an embodiment of the present invention.

FIG. 6 is a block diagram of an RTG for generating a reference timing in a UE in an asynchronous CDMA system according to an embodiment of the present invention. For clarity of description, the asynchronous CDMA system is assumed to be a W-CDMA system.

Referring to FIG. 6, the RTG is comprised of a reference counter 601, (defined as a PN code timing generator), three system frame number (SFN) RTG units 600, three Rx RTG units 630, and a Tx RTG unit 650. Each of the SFN RTG units 600 manages SFN reference timing for a corresponding target cell and each Rx RTG unit 630 manages Rx reference timing for receiving a corresponding target channel from a target cell designated as a reference cell. When a soft handover occurs, three Node Bs are usually considered, which correlates to the three SFN RTG units 600 provided in the UE. Meanwhile, since the UE manages six neighbor Node Bs in its active set, six SFN RTG units 600 can be provided.

On the assumption that the UE receives three transport channels from the reference cell, three Rx RTG units 630 are adopted. The transport channels are herein a coded composite transport channel (CCTrCH), a paging indicator channel (PICH), and an acquisition indicator channel (AICH). Obviously, the number of the Rx RTG units 630 can vary according to the number of transport channels for which reference timings are considered.

Table 1 below lists the functions and usages of the components of the RTG, for transmitting/receiving channel signals normally in the UE.

TABLE 1

| | Function | Usage |
|---|---|---|
| Reference counter | Runs free after EPOCH | Provides reference timing to searcher and each finger |
| Rx RTG unit | Provides demodulation timing for downlink channel mapped to CCTrCH, synchronizes to FB of earliest finger when readjusted, and fast tracks earliest finger. | Reference signal for Rx demodulation timing |
| Tx RTG unit | Tracks timing of reference finger for reference cell, synchronizes to FB of the reference finger when readjusted, and slow tracks reference finger. | Reference signal for Tx timing |
| SFN RTG unit | Synchronizes to timing of reference finger for each cell and directly follows timing of each reference finger without tracking. | Manages SFN of each cell and operates for active set |

As the UE is powered-up, fingers in a searcher perform an EPOCH process to synchronize to the PN code timing of a Node B. The reference counter 601 acquires the PN code timing synchronization in the EPOCH process by slewing positively or negatively. Since a scrambling code is used as a PN code in W-CDMA, the PN code timing can be said to be "scrambling code timing".

The SFN RTG unit 600 will be described in more detail. Three SFN RTG units 600 are implemented for target cells m (m=1, 2 and 3), as stated before. For the sake of convenience, it is assumed that one Node B manages one cell. Each SFN RTG unit 600, as it is enabled, runs free and is initialized by synchronizing to the FB of a reference finger for target cell m. If the searcher has 8 fingers, finger 0 to finger 7, for example, each finger receives a common pilot channel (CPICH) signal from the Node B. F0_CPICH_ANT_FB indicates the FB of a CPICH signal received at finger 0, F1_CPICH_ANT_FB indicates the FB of a CPICH signal received at finger 1, F2_CPICH_ANT_FB indicates the FB of a CPICH signal received at finger 2, F3_CPICH_ANT_FB indicates the FB of a CPICH signal received at finger 3, F4 CPICH_ANT_FB indicates the FB of a CPICH signal received at finger 4, F5_CPICH_ANT_FB indicates the FB of a CPICH signal received at finger 5, F6_CPICH_ANT_FB indicates the FB of a CPICH signal received at finger 6, and F7_CPICH_ANT_FB indicates the FB of a CPICH signal received at finger 7. Thus, Fn_CPICH_ANT_FB denotes the FB of a CPICH signal received at finger n. The FB timing will eventually become PN code timing.

A selector 611 selects the PN code timing of a reference finger according to a reference finger select signal CELL m REF_FNG, for target cell "m" received from a controller (not shown). In the meantime, the fingers demodulate broadcasting channel (BCH) signals from target cell m, detect a current SFN transmitted from target cell m, and output the detected SFN CELL m_RTG_Value_WR, to an SFN RTG 613. The SFN RTG 613 generates an SFN reference timing for target cell m, CELL m_RTG_Value_RD, based on the PN code timing received from the selector 611. The SFN RTG 613 includes a 10-ms counter for counting on a chip basis, a counter for counting an SFN from 0 to 4,095, a register for loading the detected SFN, CELL m_RTG_Value_WR, and a register for reading the current SFN, CELL m_RTG_Value_RD.

Regarding the Rx RTG unit 630, a PN code similar to that used in the CDMA-2000 system (i.e. a scrambling code) is used in the W-CDMA system. However, the PN code period is 32,768 chips (i.e. 26.67 ms) in the CDMA-2000 system, whereas it is 38,400 chips (i.e. 10 ms) in the W-CDMA system. As a UE is powered-up, a reference timing, that is, the scrambling code timing of a Node B, is acquired in an EPOCH process in the same manner as in the CDMA-2000 system. In view of the asynchronous nature, Node Bs are not synchronized to each other. A Node B cannot determine the difference (offset) in scrambling code timing between the Node B and its neighbor Node Bs because the neighbor Node Bs use scrambling codes with different timings. Unless the PN code offset between channel signals from a plurality of Node Bs, for example, two Node Bs, is narrowed within a predetermined range, a combiner in the UE cannot combine received symbols.

At a soft handover from a first Node B with a traffic channel connected to a UE to a second Node B, the first Node B commands the UE to report its current SFN. The UE then reports the current SFN to the first Node B and the first Node B controls a frame position to be changed for the second Node B according to an SFN reference timing corresponding to the current SFN. Therefore, the second Node B changes the frame offset of a DPCH instead of changing the scrambling code timing of the second Node B for the UE. This is because it is better for the UE to synchronize to the changed DPCH FB by detecting it rather than to track the FBs of CPICH signals from the Node Bs in order to minimize time required for a slew in each finger.

If the UE receives three channel signals simultaneously, three Rx RTG units 630 are provided because the channel signals have different FBs. A CCTrCH will be taken as such a channel signal. When the UE is initially powered-up, an Rx RTG 637 is enabled, runs free, and slams to the FB timing of a reference finger for a corresponding downlink channel (DL_CH). When the scrambling code timing of the reference finger, that is, the FB of a CPICH signal is changed, the Rx RTG 637 tracks the changed scrambling code timing. Considering the change of a serving Node B at soft handover, an appropriate offset must be given to the scrambling code timing (i.e., FB timing) of the reference finger input to the Rx RTG 637 in order to track the scrambling code timing at the soft handover.

More specifically, the finger FB timing signals F0_CPICH_ANT_FB to F7_CPICH_ANT_FB output from the fingers are fed to a selector 631. The selector 631 selects a finger FB timing corresponding to a reference finger select signal CHk_EAR_FNG received from the controller. The "k" in "CHk" indicates a downlink channel among a plurality of channel signals from one Node B. In general, the earliest finger is designated as the reference finger. An offset controller 633 controls the offset of the FB timing of the reference finger according to an FB offset control signal DL_CHk_FB_OFFSET received from the controller. Since the FB timing output from the selector 631 is the scrambling code timing of the CPICH signal, it is different from that of the CCTrCH signal. Therefore, the offset controller 633 generates the CCTrCH FB timing from the FB timing received from the selector 631 through offset control. Thus, DL_CHk_FB_OFFSET indicates the offset between the FB timing of the CPICH signal and that of the CCTrCH signal. A processing delay counter 635 delays the downlink channel FB timing received from the offset controller 633 by a predetermined time to prevent processing of the downlink channel FB timing because the Rx reference timing generated in the Rx RTG 637 serves as the operation timing of a combiner. The Rx RTG 637 then generates the Rx reference timing CHk_DL_FB based on the signal received from the processing delay counter.

If the finger FB timing of the reference finger is changed, an accurate Rx reference timing CHk_DL_FB is generated only when the current finger FB is tracked to the changed finger FB. To do so, a fast tracker 639 is adopted. Fast tracking refers to fast tracking relative to tracking in a Tx RTG 655. The Rx RTG 637, which is not influenced by Tx timing requirements, can track faster than the Tx RTG 655. When the FB timing of the reference finger is changed, the Rx RTG 637 can track the changed FB timing immediately, but tracks it up to the SFN preceding the current demodulated SFN of the downlink channel due to errors generated during symbol combining. For example, the Rx RTG 637 tracks the finger FB of the reference finger with a time difference of ½ symbol between adjacent symbols. For use with all spreading factors (SFs), the tracking unit is set for an SF of 4.

Figure 7A:
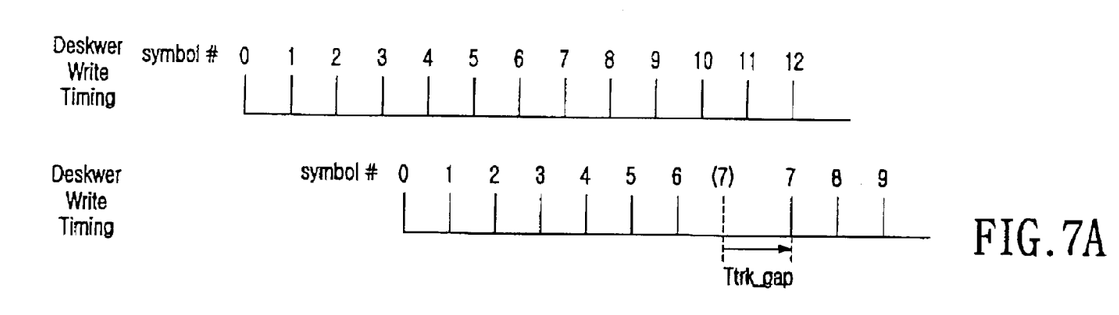
FIGS. 7A, 7B and 7C schematically illustrate Rx reference timing tracking with different tracking gaps in an Rx RTG illustrated in FIG. 6.
Figure 7B:
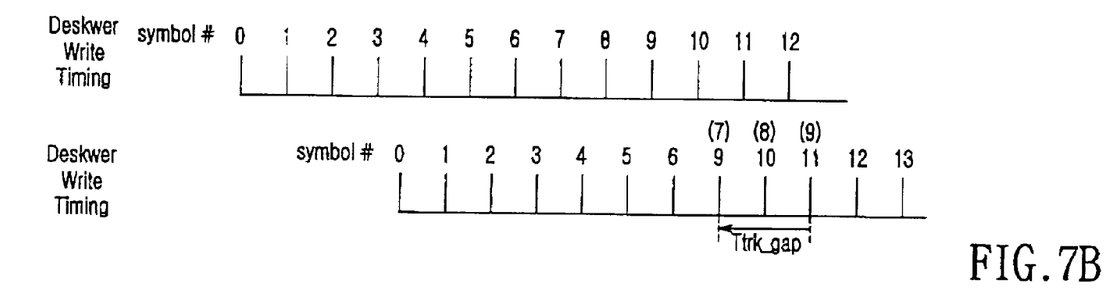
Figure 7C:
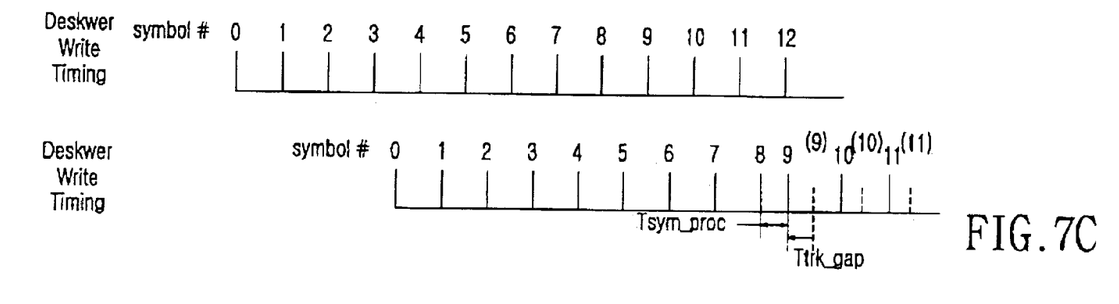

A description will be provided of Rx reference timing tracking according to the tracking unit of the Rx reference timing generated in the Rx RTG 637 with reference to FIGS. 7A, 7B and 7C.

FIGS. 7A, 7B and 7C schematically depict Rx reference timing tracking according to the tracking unit of the Rx RTG 637 illustrated in FIG. 6. For better understanding of the description, it is assumed that a slew is performed for tracking in a predetermined period "Ttrk_Per", and the slew amount per slew is "Ttrk_gap".

FIGS. 7A and 7B illustrate positive and negative slews with respect to a changed finger FB timing in the Rx RTG 637. In the case of positive slew, the Rx RTG 637 slews Ttrk_gap as illustrated in FIG. 7A. In the case of negative slew, Ttrk_gap is limited. If Ttrk_gap is set to 2 symbols as illustrated in FIG. 7B, symbols equivalent to Ttrk_gap are buffered but not used for symbol combining. For example, when a negative slew occurs at symbol 11, symbol 7 and symbol 8 are buffered. In a read operation, reading starts with symbol 9. Thus, symbol 7 and symbol 8 are eventually deleted.

To prevent symbol loss caused by negative slew, Ttrk_gap must be set to be less than a ½ symbol in consideration of combiner processing delays. Referring to FIG. 7C, with Ttrk_gap less than a ½ symbol, the time for processing symbol 8 is a ½ symbol or more. Consequently, the Rx RTG 637 tracks under the control of the fast tracker 639.

A Tx RTG generates a Tx reference timing equal to an Rx reference timing according to the standards and all BSs having the same PN code timing except for offsets in the CDMA-2000 system. Hence, an MS needs one Rx reference timing. However, a UE has a Tx reference timing earlier than an Rx reference timing by a predetermined number of chips (e.g. 1024 chips), in the W-CDMA system. In actual implementations, it may occur that 3 Rx reference timings are needed for as many Node Bs at soft handover and as a serving Node B is changed, an Rx reference timing is changed. Therefore, it is preferable to control the Tx and Rx reference timings separately in the UE. In this context, the Rx RTG unit 630 and the Tx RTG unit 650 are separately realized in the present invention.

Regarding the Tx RTG unit 650, as the UE is powered-up, the Tx RTG 655 runs free and slams to the FB timing of a reference finger for a corresponding Node B. The FB timing signals F0_CPICH_ANT_FB to F7_CPICH_ANT_FB output from the fingers are fed to a selector 651. The selector 651 selects a finger FB timing corresponding to a reference finger select signal REF_CELL_SEL received from the controller. An offset controller 653 controls the timing offset of the selected FB timing according to an FB offset control signal DL_DPCH_FB_OFFSET received from the controller. Since the FB timing output from the selector 651 is the scrambling code timing of the CPICH signal, it is different from that of the downlink DPCH. Therefore, the offset controller 653 generates the DPCH FB timing from the FB timing output from the selector 651 through offset control. The Tx RTG 655 then generates a Tx reference timing based on the DPCH FB timing.

A multiplexer (MUX) 659 multiplexes the CPICH FB timing and the DPCH FB timing in time. An uplink timing generator 661 generates an uplink Tx timing based on the multiplexed timing. Because the Tx timing of the uplink DPCH can be changed by a ⅛ chip per 140 ms, each time the DPCH FB timing is changed, it is tracked to using a slow tracker 657.

Figure 8:
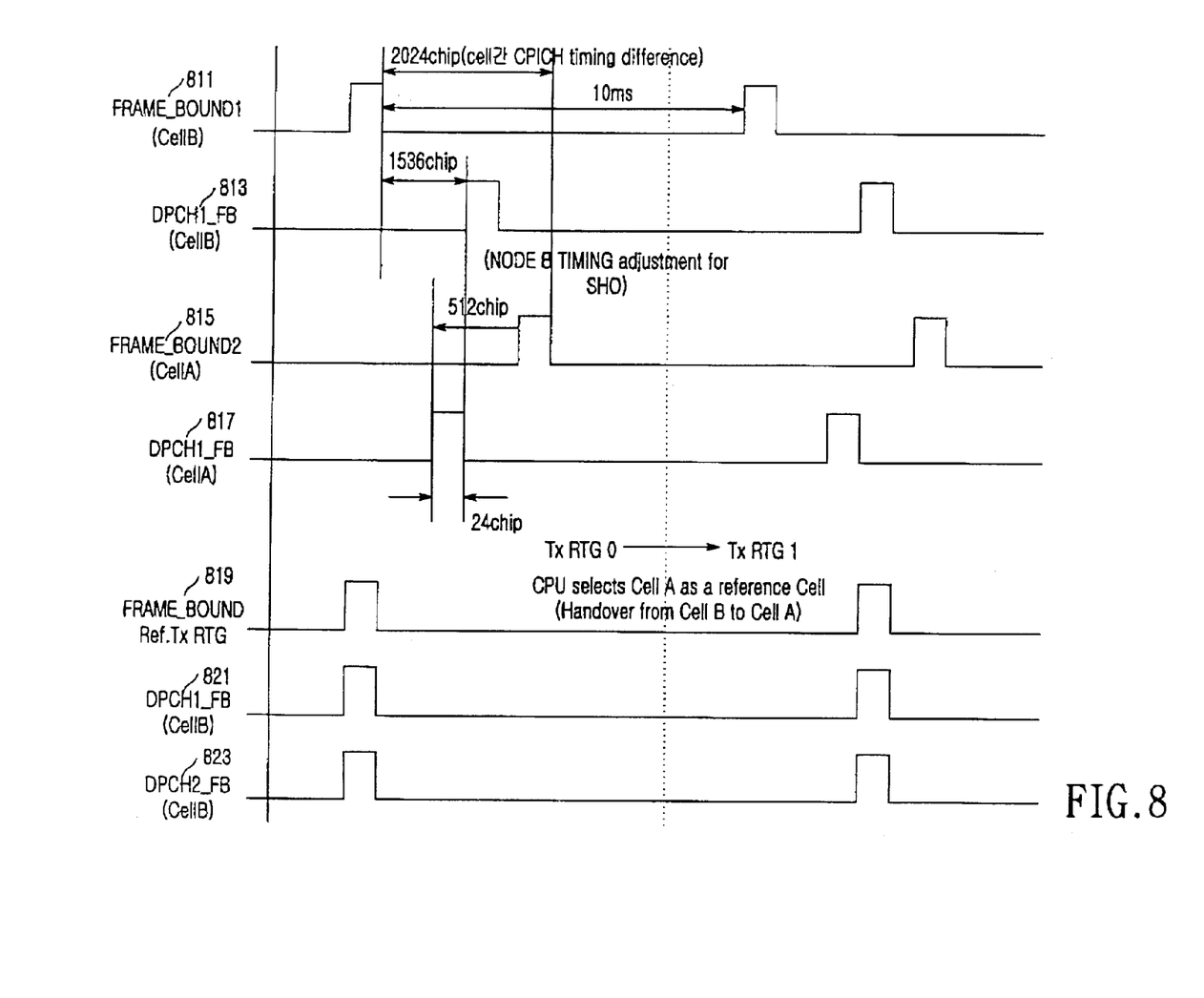
FIG. 8 schematically illustrates the timing relation between Node Bs at a soft handover according to the embodiment of the present invention.

FIG. 8 illustrates the timing relation between cell A and cell B when a UE moves from cell B to cell A at soft handover.

Referring to FIG. 8, with a communication link connected to cell B in a connected mode, the UE receives a first DPCH signal (DPCH1) 813 with a frame offset of 1536 chips from cell B. The FB of DPCH1 813 is 1536 chips apart from that of a first CPICH signal (CPICH1) 811 from cell B. As described in reference to FIG. 6, the SFN RTG 613 for cell B manages the SFNs of cell B in the SFN RTG unit 600. The Rx RTG 637 for DPCH1 813 generates the FB of DPCH1 813, that is, an Rx reference timing, by giving some offsets to the FB timing of the earliest finger (i.e., reference finger), continuously monitoring the FB timing of the reference finger, and tracking the Rx reference timing to the FB timing of the reference finger when necessary. The Tx RTG 655 also generates a Tx reference timing by tracking the FB timing of the reference finger for cell B.

As the UE communicating with cell B moves away from cell B and enters cell A, a universal mobile telecommunications system terrestrial radio access network (UTRAN) commands the UE to report to cell A a connection frame number (CFN)-SFN observed time difference.

In the meantime, the UE demodulates a BCH from cell A since the SFN RTG unit 600 already knows the SFNs and scrambling code timings of cells in a soft handover zone. The UE then loads the SFN of cell A in the SFN RTG 613 for cell A, obtains the CFN-SFN observed time difference by comparing the SFNs from the SFN RTGs 613 for cell A and cell B, and reports it to the UTRAN.

The UTRAN then adjusts the Tx timing of DPCH2 187 from cell A to that of DPCH1 813 from cell B according to the CFN-SFN observed time difference. Upon receipt of a soft handover command for changing the serving cell from cell B to cell A, the UE assigns some of the multi-path signals received from cell A to fingers and performs macro-diversity combining. Since the FB of DPCH1 813 is earlier than that of DPCH2 817, the Rx RTG 637 tracks the FB timing of DPCH2 817 of the earliest finger for cell A.

As the reference cell is changed to cell A, the offset of a DL_CH0_FB_OFFSET register is changed to an offset for cell A. Also, the Rx RTG 637 tracks the Rx reference timing to the changed timing for cell A. The Tx RTG 655 also designates the earliest finger for cell A as a reference finger and a DL_DPCH_FB_OFFSET register is reset to the offset of DPCH2 from cell A. The Tx RTG 655 slow tracks Tx reference timing according to the offset. When the soft handover is completed, the SFN RTG 613 for generating an SFN reference timing for cell B is disabled.

In accordance with the present invention, a UE needs to manage neither reference timing for each Node B nor Tx and Rx reference timings separately. Therefore, a searcher in the UE is minimized in hardware.

While the invention has been shown and described with reference to a certain embodiment thereof it will be understood by those skilled in the art that various changes in form and details may be made therein without departing from the spirit and scope of the invention as defined by the appended claims.

What is claimed is:

1. An apparatus for generating reference timings for channel signal transmission/reception in a system where each of at least two Node Bs transmits a first channel signal for providing a reference timing and a second channel signal different from the first channel signal and a user equipment (UE) having a plurality of fingers for demodulating the first channel signal, the apparatus comprising:

a first timing generator for receiving a system frame number (SFN) of a reference Node B having a communication link established with the UE, selecting a first channel frame boundary (FB) timing output from a reference finger that earliest demodulates the first channel signal from the reference Node B among the FB timings of the first channel signals from the reference Node B demodulated in the fingers, and generating an SFN reference timing based on the SFN of the reference Node B and the first channel FB timing of the reference finger;

a second timing generator for generating a second channel FB timing to demodulate the second channel signal from the reference Node B by giving a predetermined timing offset to the first channel FB timing of the reference finger; and a third timing generator for receiving the first channel FB timing of the reference finger and the second channel FB timing, and generating an uplink channel FB timing having a predetermined offset from the second channel FB timing.

2. The apparatus of claim 1, wherein the first channel is a common pilot channel (CPICH).

3. The apparatus of claim 1, wherein the second channel is a transport channel.

4. An apparatus for generating reference timings for channel signal transmission/reception in a user equipment (UE) that receives channel signals including a first channel signal from each of at least two Node Bs and has a plurality of fingers for demodulating the channel signals, the apparatus comprising:

a reference counter for receiving the first channel signal from a reference Node B currently having a communication link established with the UE and generating a code timing synchronized to a reference timing of the reference Node B;

as many first timing generators as there are Node Bs, each first timing generator receiving a first channel frame boundary (FB) timing from a reference finger being the earliest finger among the fingers that receive the first channel signal from each of the Node Bs, receiving a current system frame number (SFN) of the Node B, and generating an SFN reference timing based on the SFN of the Node B and the first channel FB timing of the reference finger;

as many second timing generators as there are channels transmitted from each Node B, each second timing generator generating a reception reference timing synchronized to a second channel FB timing by adjusting the first channel FB timing to have a predetermined first offset and delaying the adjusted first channel FB timing; and a third timing generator for receiving the first channel FB timing of the reference Node B and generating a transmission reference timing synchronized to the FB timing of uplink channel signals transmitted to the reference Node B by adjusting the first FB timing of the reference Node B to have a predetermined second offset.

5. The apparatus of claim 4, wherein the first channel is a common pilot channel (CPICH).

6. The apparatus of claim 4, wherein the second channel is a transport channel.

7. A method of generating reference timings for channel signal transmission/reception in a system where each of at least two Node Bs transmits a first channel signal for providing a reference timing and a second channel signal different from the first channel signal and a user equipment (UE) having a plurality of fingers for demodulating the first channel signal, the method comprising:

receiving a system frame number (SFN) of a reference Node B having a communication link established with the UE, selecting a first channel frame boundary (FB) timing output from a reference finger that earliest demodulates the first channel signal from the reference Node B among the FB timings of the first channel signals from the reference Node B demodulated in the fingers, and generating an SFN reference timing based on the SFN of the reference Node B and the first channel FB timing of the reference finger;

generating a second channel FB timing to demodulate the second channel signal from the reference Node B by giving a predetermined timing offset to the first channel FB timing of the reference finger; and receiving the first channel FB timing of the reference finger and the second channel FB timing and generating an uplink channel FB timing having a predetermined offset from the second channel FB timing.

8. The method of claim 7, wherein the first channel is a common pilot channel (CPICH).

9. The method of claim 7, wherein the second channel is a transport channel.

10. A method of generating reference timings for channel signal transmission/reception in a user equipment (UE) that receives channel signals including a first channel signal from each of at least two Node Bs and has a plurality of fingers for demodulating the channel signals, the method comprising:

receiving the first channel signal from a reference Node B currently having a communication link established with the UE and generating a code timing synchronized to a reference timing of the reference Node B;

receiving a first channel frame boundary (FB) timing from a reference finger being the earliest finger among the fingers that receive the first channel signal from each of the Node Bs, receiving a current system frame number (SFN) of the Node B, and generating an SFN reference timing based on the SFN of the Node B and the first channel FB timing of the reference finger;

generating a reception reference timing synchronized to the FB timing of the second channel signal from the Node B by adjusting the first channel FB timing to have a predetermined first offset and delaying the adjusted first channel FB timing; and receiving the first channel FB timing of the reference Node B and generating a transmission reference timing synchronized to the FB timing of uplink channel signals transmitted to the reference Node B by adjusting the first FB timing of the reference Node B to have a predetermined second offset.

11. The method of claim 10, wherein the first channel is a common pilot channel (CPICH).

12. The apparatus of claim 10, wherein the second channel is a transport channel.

13. An apparatus for generating a reference timing for channel signal transmission/reception in a system where each of at least two Node Bs transmits a first channel signal to provide a reference timing and a user equipment (UE) having a plurality of fingers for demodulating the first channel signal, the apparatus comprising:

a selector for selecting a first channel frame boundary (FB) timing output from a reference finger that earliest demodulates the first channel signal from a reference Node B among the FB timings of the first channel signals from the reference Node B demodulated in the fingers, the reference Node B currently having a communication link established with the UE; and a system frame number (SFN) reference timing generator for receiving an SFN of the reference Node B and generating an SFN reference timing using the SFN of the reference Node B and the first channel FB timing of the reference finger.

14. The apparatus of claim 13, wherein the first channel is a common pilot channel (CPICH).

15. An apparatus for generating a reference timing for channel signal transmission/reception in a system where each of at least two Node Bs transmits a first channel signal for providing a reference timing and a second channel signal different from the first channel signal and a user equipment (UE) having a plurality of fingers for demodulating the first channel signal, the apparatus comprising:

a selector for selecting a first channel frame boundary (FB) timing output from a reference finger that earliest demodulates the first channel signal from a reference Node B among the FB timings of the first channel signals from the reference Node B demodulated in the fingers, the reference Node B currently having a communication link established with the UE; and a reception reference timing generator for generating a second channel FB timing to demodulate the second channel signal from the reference Node B by adjusting the first channel FB timing to have a predetermined timing offset.

16. The apparatus of claim 15, wherein the first channel is a common pilot channel (CPICH).

17. The apparatus of claim 15, wherein the second channel is a transport channel.

18. An apparatus for generating a reference timing for channel signal transmission/reception in a system where each of at least two Node Bs transmits a first channel signal for providing a reference timing and a second channel signal different from the first channel signal and a user equipment (UE) having a plurality of fingers for demodulating the first channel signal, the apparatus comprising:

a selector for selecting a first channel frame boundary (FB) timing output from a reference finger that earliest demodulates the first channel signal from a reference Node B among the FB timings of the first channel signals from the reference Node B demodulated in the fingers, the reference Node B currently having a communication link established with the UE; and a transmission reference timing generator for generating an uplink channel FB timing by adjusting a second channel FB timing to have a predetermined second timing offset, the second channel FB timing being generated for demodulating the second channel signal from the reference Node B by adjusting the first channel FB timing of the reference finger to have a predetermined first timing offset.

19. The apparatus of claim 18, wherein the first channel is a common pilot channel (CPICH).

20. The apparatus of claim 18, wherein the second channel is a transport channel.

21. A method of generating a reference timing for channel signal transmission/reception in a system where each of at least two Node Bs transmits a first channel signal for providing a reference timing and a second channel signal different from the first channel signal and a user equipment (UE) having a plurality of fingers for demodulating the first channel signal, the method comprising:

selecting a first channel frame boundary (FB) timing output from a reference finger that earliest demodulates the first channel signal from a reference Node B among the FB timings of the first channel signals from the reference Node B demodulated in the fingers, the reference Node B currently having a communication link established with the UE; and receiving an SFN of the reference Node B and generating an SFN reference timing using the SFN of the reference Node B and the first channel FB timing of the reference finger.

22. The method of claim 21, wherein the first channel is a common pilot channel (CPICH).

23. A method of generating a reference timing for channel signal transmission/reception in a system where each of at least two Node Bs transmits a first channel signal for providing a reference timing and a second channel signal different from the first channel signal and a user equipment (UE) having a plurality of fingers for demodulating the first channel signal, the method comprising:

selecting a first channel frame boundary (FB) timing output from a reference finger that earliest demodulates the first channel signal from a reference Node B among the FB timings of the first channel signals from the reference Node B demodulated in the fingers, the reference Node B currently having a communication link established with the UE; and generating a second channel FB timing to demodulate the second channel signal from the reference Node B by adjusting the first channel FB timing to have a predetermined timing offset.

24. The method of claim 23, wherein the first channel is a common pilot channel (CPICH).

25. The method of claim 23, wherein the second channel is a transport channel.

26. A method of generating a reference timing for channel signal transmission/reception in a system where each of at least two Node Bs transmits a first channel signal for providing a reference timing and a second channel signal different from the first channel signal and a user equipment (UE) having a plurality of fingers for demodulating the first channel signal, the method comprising:

selecting a first channel frame boundary (FB) timing output from a reference finger that earliest demodulates the first channel signal from a reference Node B among the FB timings of the first channel signals from the reference Node B demodulated in the fingers, the reference Node B currently having a communication link established with the UE; and generating an uplink channel FB timing by adjusting a second channel FB timing to have a predetermined second timing offset, the second channel FB timing being generated for demodulating the second channel signal from the reference Node B by adjusting the first channel FB timing of the reference finger to have a predetermined first timing offset.

27. The method of claim 26, wherein the first channel is a common pilot channel (CPICH).

28. The method of claim 26, wherein the second channel is a transport channel.

* * * * *